US010275377B2

(12) United States Patent
Baratam et al.

(10) Patent No.: US 10,275,377 B2
(45) Date of Patent: Apr. 30, 2019

(54) DYNAMIC BOOT IMAGE STREAMING

(71) Applicant: Marvell World Trade Ltd., St. Michael (BB)

(72) Inventors: Vamsi Krishna Baratam, Westborough, MA (US); Tolga Nihat Aytek, Framingham, MA (US)

(73) Assignee: Marvell World Trade Ltd., St. Michael (BB)

( * ) Notice: Subject to any disclaimer, the term of this patent is extended or adjusted under 35 U.S.C. 154(b) by 231 days.

(21) Appl. No.: 15/151,016

(22) Filed: May 10, 2016

(65) Prior Publication Data
US 2016/0253278 A1  Sep. 1, 2016

Related U.S. Application Data

(62) Division of application No. 13/676,701, filed on Nov. 14, 2012, now Pat. No. 9,436,629.

(60) Provisional application No. 61/560,217, filed on Nov. 15, 2011.

(51) Int. Cl.
*G06F 9/4401* (2018.01)
*G06F 13/28* (2006.01)
*G06F 3/06* (2006.01)
*G06F 13/16* (2006.01)

(52) U.S. Cl.
CPC ............ *G06F 13/28* (2013.01); *G06F 3/0607* (2013.01); *G06F 3/0659* (2013.01); *G06F 3/0685* (2013.01); *G06F 9/441* (2013.01); *G06F 13/1694* (2013.01); *G06F 2213/2802* (2013.01)

(58) Field of Classification Search
CPC ............. G06F 1/26; G06F 1/32; G06F 9/4401
See application file for complete search history.

(56) References Cited

U.S. PATENT DOCUMENTS

| 5,155,833 A | 10/1992 | Cullison et al. |
| 5,390,165 A | 2/1995 | Tuch |
| 5,467,398 A | 11/1995 | Pierce et al. |
| 5,469,506 A | 11/1995 | Berson et al. |
| 5,479,514 A | 12/1995 | Klonowski |

(Continued)

FOREIGN PATENT DOCUMENTS

| CN | 1140272 | 1/1997 |
| CN | 102272734 | 9/2014 |

(Continued)

OTHER PUBLICATIONS

"Corrected Notice of Allowance", U.S. Appl. No. 14/205,196, dated Apr. 18, 2017, 2 pages.

(Continued)

*Primary Examiner* — Phil K Nguyen

(57) ABSTRACT

The present disclosure describes apparatuses and techniques for dynamic boot image streaming. In some aspects a memory controller that is streaming multiple boot images from a first memory to a second memory is stalled, a descriptor for streaming one of the multiple boot images from the first memory to a non-contiguous memory location is generated while the memory controller is stalled, and the memory controller is resumed effective to cause the memory controller to stream, based on the descriptor generated while the memory controller is stalled, the second boot image to the non-contiguous memory location.

20 Claims, 7 Drawing Sheets

(56) References Cited

U.S. PATENT DOCUMENTS

| | | | |
|---|---|---|---|
| 5,481,733 A | 1/1996 | Douglis et al. | |
| 5,617,118 A | 4/1997 | Thompson | |
| 5,652,895 A * | 7/1997 | Poisner | G06F 1/3203 |
| | | | 713/321 |
| 5,673,416 A | 9/1997 | Chee et al. | |
| 5,696,989 A | 12/1997 | Miura et al. | |
| 5,771,356 A | 6/1998 | Leger et al. | |
| 5,828,835 A | 10/1998 | Isfeld et al. | |
| 5,884,099 A | 3/1999 | Klingelhofer | |
| 5,991,519 A | 11/1999 | Benhammou et al. | |
| 6,006,018 A | 12/1999 | Burnett et al. | |
| 6,014,722 A | 1/2000 | Rudin et al. | |
| 6,092,108 A | 7/2000 | DiPlacido et al. | |
| 6,145,069 A | 11/2000 | Dye | |
| 6,216,230 B1 | 4/2001 | Rallis et al. | |
| 6,230,277 B1 | 5/2001 | Nakaoka et al. | |
| 6,330,626 B1 | 12/2001 | Dennin et al. | |
| 6,389,538 B1 | 5/2002 | Gruse et al. | |
| 6,463,509 B1 | 10/2002 | Teoman et al. | |
| 6,473,861 B1 | 10/2002 | Stokes | |
| 6,564,318 B1 | 5/2003 | Gharda et al. | |
| 6,601,167 B1 | 7/2003 | Gibson et al. | |
| 6,678,790 B1 | 1/2004 | Kumar | |
| 6,711,447 B1 | 3/2004 | Saeed | |
| 6,756,988 B1 | 6/2004 | Wang et al. | |
| 6,799,271 B2 | 9/2004 | Kugai | |
| 6,823,472 B1 | 11/2004 | DeKoning et al. | |
| 6,832,280 B2 | 12/2004 | Malik et al. | |
| 6,901,298 B1 | 5/2005 | Govindaraj et al. | |
| 7,010,808 B1 | 3/2006 | Leung et al. | |
| 7,035,827 B2 | 4/2006 | Ezaki | |
| 7,036,018 B2 | 4/2006 | Horvat et al. | |
| 7,089,419 B2 | 8/2006 | Foster et al. | |
| 7,103,788 B1 | 9/2006 | Souza et al. | |
| 7,117,352 B1 | 10/2006 | Giles et al. | |
| 7,126,913 B1 | 10/2006 | Patel et al. | |
| 7,194,638 B1 | 3/2007 | Larky | |
| 7,206,940 B2 | 4/2007 | Evans et al. | |
| 7,210,038 B2 | 4/2007 | Walmsley | |
| 7,266,842 B2 | 9/2007 | Foster et al. | |
| 7,299,365 B2 | 11/2007 | Evans | |
| 7,308,591 B2 | 12/2007 | Dubinsky | |
| 7,356,707 B2 | 4/2008 | Foster et al. | |
| 7,370,349 B2 | 5/2008 | Holvey et al. | |
| 7,373,506 B2 | 5/2008 | Asano et al. | |
| 7,376,976 B2 | 5/2008 | Fierstein et al. | |
| 7,496,952 B2 | 2/2009 | Edwards et al. | |
| 7,511,636 B2 | 3/2009 | Takahashi | |
| 7,522,726 B2 | 4/2009 | Ishiguro et al. | |
| 7,536,558 B2 | 5/2009 | Neble et al. | |
| 7,549,056 B2 | 6/2009 | Carr | |
| 7,571,216 B1 | 8/2009 | McRae et al. | |
| 7,596,614 B2 | 9/2009 | Saunderson et al. | |
| 7,606,230 B1 | 10/2009 | Cohen et al. | |
| 7,620,784 B2 | 11/2009 | Panabaker | |
| 7,676,040 B2 | 3/2010 | Augenstein et al. | |
| 7,725,738 B1 | 5/2010 | Langhammer et al. | |
| 7,743,260 B2 | 6/2010 | Fetik | |
| 7,774,635 B2 | 8/2010 | Shiota | |
| 7,788,670 B2 | 8/2010 | Bodas et al. | |
| 7,818,389 B1 | 10/2010 | Chiang et al. | |
| 7,865,733 B2 | 1/2011 | Goto et al. | |
| 7,873,841 B2 | 1/2011 | Mullis, II et al. | |
| 7,898,857 B2 | 3/2011 | Kirsch et al. | |
| 7,900,060 B2 | 3/2011 | Hodzic | |
| 7,991,943 B2 | 8/2011 | Berenbaum et al. | |
| 7,995,596 B2 | 8/2011 | Kuila et al. | |
| 8,000,284 B2 | 8/2011 | Lott et al. | |
| 8,001,592 B2 | 8/2011 | Hatakeyama | |
| 8,095,816 B1 | 1/2012 | Chan | |
| 8,117,478 B2 | 2/2012 | Liu et al. | |
| 8,139,521 B2 | 3/2012 | Mukherjee et al. | |
| 8,171,309 B1 | 5/2012 | Poo | |
| 8,296,555 B2 | 10/2012 | Chu | |
| 8,321,706 B2 | 11/2012 | Zhang | |
| 8,327,056 B1 | 12/2012 | Chan | |
| 8,423,789 B1 | 4/2013 | Poo et al. | |
| 8,443,187 B1 | 5/2013 | Orr | |
| 8,443,211 B2 | 5/2013 | Zhao et al. | |
| 8,510,560 B1 | 8/2013 | Lambert et al. | |
| 8,645,716 B1 | 2/2014 | Dujari et al. | |
| 8,688,968 B2 | 4/2014 | Chu et al. | |
| 8,839,016 B2 | 9/2014 | Zhang et al. | |
| 8,843,686 B1 | 9/2014 | Chan et al. | |
| 9,009,778 B2 | 4/2015 | Pearce et al. | |
| 9,141,394 B2 | 9/2015 | Sakarda | |
| 9,253,175 B1 | 2/2016 | Orr | |
| 9,436,629 B2 | 9/2016 | Baratam et al. | |
| 9,652,249 B1 | 5/2017 | Chu et al. | |
| 2002/0065834 A1 | 5/2002 | Wiggen et al. | |
| 2002/0069354 A1 | 6/2002 | Fallon et al. | |
| 2002/0087816 A1 | 7/2002 | Atkinson et al. | |
| 2003/0014368 A1 | 1/2003 | Leurig et al. | |
| 2003/0188162 A1 | 10/2003 | Candelore et al. | |
| 2003/0200453 A1 | 10/2003 | Foster et al. | |
| 2003/0200454 A1 | 10/2003 | Foster et al. | |
| 2003/0208675 A1 | 11/2003 | Burokas et al. | |
| 2003/0236991 A1 | 12/2003 | Letsinger | |
| 2004/0015621 A1 | 1/2004 | Tanaka | |
| 2004/0030909 A1 | 2/2004 | Sako et al. | |
| 2004/0054898 A1 | 3/2004 | Chao et al. | |
| 2004/0103272 A1 | 5/2004 | Zimmer et al. | |
| 2004/0125679 A1 | 7/2004 | Kwean | |
| 2004/0158669 A1 | 8/2004 | Weng et al. | |
| 2004/0184343 A1 | 9/2004 | Roohparvar et al. | |
| 2004/0187001 A1 | 9/2004 | Bousis | |
| 2004/0257462 A1 | 12/2004 | Goris et al. | |
| 2004/0266386 A1 | 12/2004 | Kuo | |
| 2005/0033869 A1 | 2/2005 | Cline | |
| 2005/0055547 A1 | 3/2005 | Kawamura | |
| 2005/0086551 A1 | 4/2005 | Wirasinghe et al. | |
| 2005/0108171 A1 | 5/2005 | Bajikar et al. | |
| 2005/0108469 A1 * | 5/2005 | Freeman | G06F 13/16 |
| | | | 711/105 |
| 2005/0114686 A1 | 5/2005 | Ball et al. | |
| 2005/0138365 A1 | 6/2005 | Bellipady et al. | |
| 2005/0144468 A1 | 6/2005 | Northcutt et al. | |
| 2005/0156925 A1 | 7/2005 | Fong et al. | |
| 2005/0177674 A1 | 8/2005 | Ober et al. | |
| 2005/0210290 A1 | 9/2005 | Ono et al. | |
| 2005/0278523 A1 | 12/2005 | Fortin et al. | |
| 2006/0004946 A1 | 1/2006 | Shah et al. | |
| 2006/0036897 A1 | 2/2006 | Lin et al. | |
| 2006/0059372 A1 | 3/2006 | Fayar et al. | |
| 2006/0072748 A1 | 4/2006 | Buer | |
| 2006/0075259 A1 | 4/2006 | Bajikar et al. | |
| 2006/0090084 A1 | 4/2006 | Buer | |
| 2006/0117177 A1 | 6/2006 | Buer | |
| 2006/0123248 A1 | 6/2006 | Porter et al. | |
| 2006/0136735 A1 | 6/2006 | Plotkin et al. | |
| 2006/0142906 A1 | 6/2006 | Brozovich et al. | |
| 2006/0156390 A1 | 7/2006 | Baugher | |
| 2006/0161695 A1 * | 7/2006 | Mochizuki | G06F 13/28 |
| | | | 710/22 |
| 2006/0200670 A1 | 9/2006 | Kuffel et al. | |
| 2006/0209595 A1 | 9/2006 | Newell | |
| 2006/0233149 A1 | 10/2006 | Rustagi et al. | |
| 2006/0253716 A1 | 11/2006 | Dhiman et al. | |
| 2006/0259656 A1 | 11/2006 | Sullivan | |
| 2006/0285686 A1 | 12/2006 | Van Den Heuvel et al. | |
| 2007/0005824 A1 | 1/2007 | Howard | |
| 2007/0011445 A1 | 1/2007 | Waltermann et al. | |
| 2007/0038866 A1 | 2/2007 | Bardsley et al. | |
| 2007/0073915 A1 | 3/2007 | Go et al. | |
| 2007/0097904 A1 | 5/2007 | Mukherjee et al. | |
| 2007/0136792 A1 | 6/2007 | Ting et al. | |
| 2007/0150756 A1 | 6/2007 | Kudelski | |
| 2007/0174602 A1 | 7/2007 | Kao | |
| 2007/0180271 A1 | 8/2007 | Hatakeyama et al. | |
| 2007/0186105 A1 | 8/2007 | Bailey et al. | |
| 2007/0189249 A1 | 8/2007 | Gurevich et al. | |
| 2007/0220501 A1 | 9/2007 | Yanagawa et al. | |
| 2007/0234028 A1 | 10/2007 | Rothman et al. | |
| 2007/0260905 A1 | 11/2007 | Marsden et al. | |

(56) References Cited

U.S. PATENT DOCUMENTS

| | | |
|---|---|---|
| 2007/0277051 A1 | 11/2007 | Reece et al. |
| 2007/0297606 A1 | 12/2007 | Tkacik et al. |
| 2008/0005549 A1 | 1/2008 | Ke |
| 2008/0016313 A1 | 1/2008 | Murotake et al. |
| 2008/0028243 A1 | 1/2008 | Morisawa |
| 2008/0034411 A1 | 2/2008 | Aoyama |
| 2008/0043508 A1 | 2/2008 | Chao et al. |
| 2008/0046732 A1 | 2/2008 | Fu et al. |
| 2008/0066075 A1 | 3/2008 | Nutter et al. |
| 2008/0072311 A1 | 3/2008 | Mullick et al. |
| 2008/0082837 A1 | 4/2008 | Mattsson |
| 2008/0091944 A1 | 4/2008 | von Mueller et al. |
| 2008/0104422 A1 | 5/2008 | Mullis et al. |
| 2008/0108322 A1 | 5/2008 | Upp |
| 2008/0120717 A1 | 5/2008 | Shakkarwar |
| 2008/0165952 A1 | 7/2008 | Smith et al. |
| 2008/0295157 A1 | 11/2008 | Wong et al. |
| 2008/0298289 A1 | 12/2008 | Jeyaseelan |
| 2008/0313462 A1 | 12/2008 | Zhao et al. |
| 2009/0006658 A1 | 1/2009 | Gough |
| 2009/0024846 A1 | 1/2009 | Ganesan et al. |
| 2009/0049222 A1 | 2/2009 | Lee et al. |
| 2009/0077618 A1 | 3/2009 | Pearce et al. |
| 2009/0199031 A1 | 8/2009 | Zhang |
| 2009/0254771 A1 | 10/2009 | So et al. |
| 2009/0327608 A1 | 12/2009 | Eschmann et al. |
| 2010/0023747 A1 | 1/2010 | Asnaashari et al. |
| 2010/0039864 A1 | 2/2010 | Sarin et al. |
| 2010/0058045 A1 | 3/2010 | Borras et al. |
| 2010/0070751 A1 | 3/2010 | Chue |
| 2010/0174934 A1 | 7/2010 | Zhao |
| 2010/0217935 A1 | 8/2010 | Cho et al. |
| 2012/0287337 A1 | 11/2012 | Kumar et al. |
| 2013/0031346 A1 | 1/2013 | Sakarda |
| 2013/0046966 A1 | 2/2013 | Chu |
| 2013/0124844 A1 | 5/2013 | Baratam |
| 2013/0346777 A1 | 12/2013 | Zhang |

FOREIGN PATENT DOCUMENTS

| | | |
|---|---|---|
| EP | 1847911 | 10/2007 |
| JP | 08076872 | 3/1996 |
| JP | 09044418 | 2/1997 |
| JP | 10320302 | 12/1998 |
| JP | 2002099502 | 4/2002 |
| JP | 2002215409 | 8/2002 |
| JP | 2004005254 | 1/2004 |
| JP | 2005011120 | 1/2005 |
| JP | 5565778 | 6/2014 |
| WO | WO-2013019423 | 2/2013 |
| WO | WO-2013074797 | 5/2013 |

OTHER PUBLICATIONS

"Final Office Action", U.S. Appl. No. 14/205,196, dated Aug. 25, 2016, 16 pages.
"Board Opinion", CN Application No. 200980136849.9, dated Aug. 28, 2015, 18 Pages.
"Examiner's Answer to Appeal Brief", U.S. Appl. No. 13/958,101, dated Apr. 8, 2016, 9 pages.
"Extensions to Direct Link Setup (DLS) Comments", IEEE, P802.11z, Jul. 2009, pp. 1-3.
"Final Office Action", U.S. Appl. No. 12/098,254, dated May 18, 2011, 11 pages.
"Final Office Action", U.S. Appl. No. 12/101,668, dated May 10, 2012, 8 pages.
"Final Office Action", U.S. Appl. No. 12/125,670, dated May 24, 2011, 11 pages.
"Final Office Action", U.S. Appl. No. 12/125,693, dated Jun. 9, 2011, 9 pages.
"Final Office Action", U.S. Appl. No. 12/178,268, dated May 25, 2011, 13 pages.
"Final Office Action", U.S. Appl. No. 12/541,731, dated May 31, 2012, 11 pages.
"Final Office Action", U.S. Appl. No. 13/552,421, dated Mar. 16, 2015, 10 pages.
"Final Office Action", U.S. Appl. No. 13/863,079, dated Jan. 15, 2015, 7 pages.
"Final Office Action", U.S. Appl. No. 13/863,079, dated May 7, 2014, 7 pages.
"Final Office Action", U.S. Appl. No. 13/958,101, dated Dec. 19, 2014, 17 pages.
"Foreign Office Action", CN Application No. 200980136849.9, dated May 24, 2013, 20 Pages.
"Foreign Decision to Grant", JP Application No. 2011-544456, dated May 20, 2014, 2 pages.
"Foreign Notice of Allowance", CN Application No. 200980153758.6, dated Jul. 15, 2014, 4 Pages.
"Foreign Notice of Allowance", JP Application No. 2011-527899, dated Jan. 28, 2014, 1 Page.
"Foreign Office Action", CN Application No. 200980136849.9, dated Feb. 7, 2014, 15 Pages.
"Foreign Office Action", CN Application No. 200980136849.9, dated May 19, 2014, 11 Pages.
"Foreign Office Action", CN Application No. 200980153758.6, dated Apr. 27, 2013, 14 pages.
"Foreign Office Action", CN Application No. 200980153758.6, dated Dec. 30, 2013, 8 pages.
"Foreign Office Action", European Patent Application No. 09803951.4, dated May 24, 2012, 3 pages.
"Foreign Office Action", European Patent Application No. 09803951.4, dated Dec. 13, 2012, 6 pages.
"Foreign Office Action", JP Application No. 2011-527899, dated Apr. 16, 2013, 5 pages.
"Foreign Office Action", JP Application No. 2011-527899, dated Nov. 6, 2012, 4 pages.
"Foreign Office Action", JP Application No. 2011-527899, dated Aug. 13, 2013, 2 pages.
"Foreign Office Action", JP Application No. 2011-544456, dated Jan. 29, 2013, 7 pages.
"Foreign Office Action", JP Application No. 2011-544456, dated Dec. 3, 2013, 2 pages.
"Foreign Office Action", JP Application No. 2011-544456, dated Jul. 9, 2013, 6 pages.
"Foreign Office Action", KR Application No. 10-2011-7008700, dated Jun. 16, 2015, 13 Pages.
"Intent to Grant", EP Application No. 09803951.4, dated May 14, 2013, 13 Pages.
"International Search Report and Written Opinion", Application No. PCT/US2009/067767, dated Mar. 26, 2010, 12 pages.
"International Search Report and Written Opinion", Application No. PCT/US2009/056973, dated Nov. 4, 2009, 13 pages.
"International Search Report and Written Opinion", Application No. PCT/US2012/047426, dated Oct. 19, 2012, 7 pages.
"International Search Report and Written Opinion", Application No. PCT/US2012/065290, dated May 2, 2013, 9 pages.
"International Search Report", Application No. PCT/US2008/078343, dated May 18, 2009, 5 pages.
"International Search Report", Application No. PCT/US2008/078343, Partial International Search, dated Mar. 5, 2009, 2 pages.
"Non-Final Office Action", U.S. Appl. No. 12/098,254, dated Jan. 14, 2011, 8 pages.
"Non-Final Office Action", U.S. Appl. No. 12/101,668, dated Apr. 5, 2011, 7 pages.
"Non-Final Office Action", U.S. Appl. No. 12/101,668, dated Aug. 9, 2012, 8 pages.
"Non-Final Office Action", U.S. Appl. No. 12/125,670, dated Dec. 13, 2011, 11 pages.
"Non-Final Office Action", U.S. Appl. No. 12/125,670, dated Dec. 7, 2010, 9 pages.
"Non-Final Office Action", U.S. Appl. No. 12/125,670, dated Jun. 4, 2012, 12 pages.
"Non-Final Office Action", U.S. Appl. No. 12/125,693, dated Oct. 3, 2011, 7 pages.

(56) References Cited

OTHER PUBLICATIONS

"Non-Final Office Action", U.S. Appl. No. 12/125,693, dated Dec. 20, 2010, 7 pages.
"Non-Final Office Action", U.S. Appl. No. 12/178,268, dated Dec. 21, 2011, 13 pages.
"Non-Final Office Action", U.S. Appl. No. 12/178,268, dated Dec. 22, 2010, 10 pages.
"Non-Final Office Action", U.S. Appl. No. 12/271,761, dated Oct. 3, 2011, 6 pages.
"Non-Final Office Action", U.S. Appl. No. 12/541,731, dated Oct. 21, 2011, 9 pages.
"Non-Final Office Action", U.S. Appl. No. 12/541,731, dated Sep. 4, 2012, 11 pages.
"Non-Final Office Action", U.S. Appl. No. 12/559,987, dated Nov. 9, 2011, 10 pages.
"Non-Final Office Action", U.S. Appl. No. 12/636,558, dated Jan. 10, 2012, 6 pages.
"Non-Final Office Action", U.S. Appl. No. 12/636,558, dated May 29, 2012, 8 pages.
"Non-Final Office Action", U.S. Appl. No. 13/252,416, dated Mar. 13, 2013, 16 pages.
"Non-Final Office Action", U.S. Appl. No. 13/333,551, dated Apr. 6, 2012, 5 pages.
"Non-Final Office Action", U.S. Appl. No. 13/552,421, dated Sep. 30, 2014, 23 pages.
"Non-Final Office Action", U.S. Appl. No. 13/598,282, dated Oct. 16, 2013, 6 pages.
"Non-Final Office Action", U.S. Appl. No. 13/657,511, dated Mar. 28, 2013, 13 pages.
"Non-Final Office Action", U.S. Appl. No. 13/676,701, dated Jul. 31, 2015, 12 pages.
"Non-Final Office Action", U.S. Appl. No. 13/683,056, dated Nov. 8, 2013, 5 pages.
"Non-Final Office Action", U.S. Appl. No. 13/863,079, dated Apr. 9, 2015, 7 pages.
"Non-Final Office Action", U.S. Appl. No. 13/863,079, dated Jun. 20, 2013, 10 pages.
"Non-Final Office Action", U.S. Appl. No. 13/863,079, dated Aug. 27, 2014, 6 pages.
"Non-Final Office Action", U.S. Appl. No. 13/863,079, dated Oct. 1, 2013, 9 pages.
"Non-Final Office Action", U.S. Appl. No. 13/874,201, dated Jun. 5, 2015, 10 pages.
"Non-Final Office Action", U.S. Appl. No. 13/958,101, dated Apr. 8, 2015, 16 pages.
"Non-Final Office Action", U.S. Appl. No. 13/958,101, dated Jun. 6, 2014, 14 pages.
"Non-Final Office Action", U.S. Appl. No. 14/205,196, dated Feb. 5, 2016, 14 pages.
"Notice of Allowance", U.S. Appl. No. 12/098,254, dated Dec. 14, 2011, 4 pages.
"Notice of Allowance", U.S. Appl. No. 12/098,254, dated Sep. 28, 2011, 4 pages.
"Notice of Allowance", U.S. Appl. No. 12/101,668, dated Jan. 11, 2013, 6 pages.
"Notice of Allowance", U.S. Appl. No. 12/125,670, dated Dec. 11, 2012, 8 pages.
"Notice of Allowance", U.S. Appl. No. 12/178,268, dated Jul. 2, 2012, 4 pages.
"Notice of Allowance", U.S. Appl. No. 12/271,761, dated Jan. 3, 2012, 6 pages.
"Notice of Allowance", U.S. Appl. No. 12/541,731, dated Apr. 2, 2013, 8 pages.
"Notice of Allowance", U.S. Appl. No. 12/559,987, dated Jun. 15, 2012, 5 pages.
"Notice of Allowance", U.S. Appl. No. 12/636,558, dated Jan. 9, 2013, 4 pages.
"Notice of Allowance", U.S. Appl. No. 13/252,416, dated Sep. 27, 2013, 10 pages.
"Notice of Allowance", U.S. Appl. No. 13/333,551, dated May 30, 2012, 4 pages.
"Notice of Allowance", U.S. Appl. No. 13/552,421, dated May 12, 2015, 4 pages.
"Notice of Allowance", U.S. Appl. No. 13/552,421, dated Jun. 10, 2015, 5 pages.
"Notice of Allowance", U.S. Appl. No. 13/598,282, dated May 6, 2014, 4 pages.
"Notice of Allowance", U.S. Appl. No. 13/657,511, dated Nov. 4, 2013, 9 pages.
"Notice of Allowance", U.S. Appl. No. 13/676,701, dated Feb. 10, 2016, 5 pages.
"Notice of Allowance", U.S. Appl. No. 13/683,056, dated May 9, 2014, 4 pages.
"Notice of Allowance", U.S. Appl. No. 13/874,201, dated Sep. 25, 2015, 6 pages.
"Part 11—Wireless LAN Medium Access Control (MAC) and Physical Layer (PHY) Specifications", Information Technology—Telecommunications & Information Exchange Between Systems . . . International Standard, ISO/IEC 8802-11, First Ed., 1999, pp. 1-531.
"Restriction Requirement", U.S. Appl. No. 12/101,668, dated Sep. 22, 2011, 6 pages.
"Restriction Requirement", U.S. Appl. No. 13/676,701, dated Feb. 12, 2015, 7 pages.
"Supplemental Notice of Allowance", U.S. Appl. No. 12/101,668, dated Feb. 8, 2013, 4 Pages.
"Supplemental Notice of Allowance", U.S. Appl. No. 13/333,551, dated Oct. 23, 2012, 2 pages.
Anderson,"HDD Based Full Disc Encryption", In Proceedings of THIC Conference 2006, Mar. 2006, 12 pages.
"Corrected Notice of Allowance", U.S. Appl. No. 13/676,701, dated May 18, 2016, 2 pages.
"Notice of Allowance", U.S. Appl. No. 14/205,196, dated Jan. 3, 2017, 5 pages.

* cited by examiner

DYNAMIC BOOT IMAGE STREAMING

RELATED APPLICATION

This application is a divisional of U.S. Utility patent application Ser. No. 13/676,701 filed Nov. 14, 2012, which in turn claims priority to U.S. Provisional Patent Application Ser. No. 61/560,217 filed Nov. 15, 2011, the disclosures of which are incorporated by reference herein in their entirety.

BACKGROUND

The background description provided herein is for the purpose of generally presenting the context of the disclosure. Work of the presently named inventors, to the extent it is described in this background section, as well as aspects of the description that may not otherwise qualify as prior art at the time of filing, are neither expressly nor impliedly admitted as prior art against the present disclosure.

Computing and electronic devices often include various types of memory for storing data of operating systems, applications, or user files. Before an operating system and applications are run on the device, however, low-level code is used to configure and boot the device. When booting a device, the low-level code is typically copied from one of the memories and executed by a processor in order to configure the components of the device for operation. The memory storing the low-level code is often a non-volatile memory, from which the low-level code is copied into another memory prior to execution. Due to recent advances in memory-controller technology, this low-level code may be streamed to the other memory with minimal initialization or overhead, which may increase a speed at which the device boots.

Memory controllers capable of streaming the low-level code from the non-volatile memory, however, stream the low-level code to contiguous locations of the other memory. This other memory, however, may not have enough capacity to receive all of the low-level code or be a memory from which execution of some of the low-level code is not optimal. Accordingly, some partial solutions prevent streaming until the memory controller is fully initialized. Waiting until the memory controller is fully initialized, however, often consumes considerable time and processing resources, which results in slower device boot times.

SUMMARY

This summary is provided to introduce subject matter that is further described below in the Detailed Description and Drawings. Accordingly, this Summary should not be considered to describe essential features nor used to limit the scope of the claimed subject matter.

A method is described for stalling a memory controller that is streaming, via a direct memory access (DMA) operation, multiple boot images from a first memory to a second memory, generating, while the memory controller is stalled, a descriptor for streaming a second one of the multiple boot images from the first memory to a non-contiguous memory location, and resuming the memory controller effective to cause the memory controller to stream, based on the descriptor and via another DMA operation, the second boot image to the non-contiguous memory location.

A memory storage device is described that includes memory storage media storing multiple boot images executable by a processor of a host device to initialize components of the host device during a boot sequence, a header executable by the processor of the host device to construct a series of data transfer commands for streaming the multiple boot images to non-contiguous locations of another memory storage device, another data transfer command associated with the header executable by a memory controller to stream the header to a base address of the other memory storage device, and a data link command executable by the controller to stall the DMA engine effective to permit the header to be executed from the other memory storage device by the processor to construct the series of data transfer commands for streaming the multiple boot images.

A computing device is described that includes a stream manager that is configured to stall a memory controller while the memory controller is streaming, via a direct memory access (DMA) operation, multiple boot images from a non-volatile memory of the computing device to a volatile memory of the computing device, the memory controller stalled after streaming a first one of the multiple boot images to the volatile memory. Additionally, the stream manager generates, while the memory controller is stalled and based on the first boot image streamed to the volatile memory, a descriptor for streaming a second one of the multiple boot images from the non-volatile memory to a non-contiguous location of the volatile memory. The stream manager then resumes the memory controller effective to cause the memory controller to stream, based on the descriptor and via another DMA operation, the second boot image to the non-contiguous location of the volatile memory.

The details of one or more implementations are set forth in the accompanying drawings and the description below. Other features and advantages will be apparent from the description and drawings.

BRIEF DESCRIPTION OF THE DRAWINGS

In the figures, the left-most digit of a reference number identifies the figure in which the reference number first appears. The use of the same reference numbers in different instances in the description and the figures indicate like elements.

DETAILED DESCRIPTION

Conventional techniques for streaming boot images stream boot images from one memory to contiguous locations of another memory. For example, an alternate boot mode of a memory controller may stream boot image data to a base address of the other memory, and may not be redirected or paused once the streaming of data begins. The other memory, however, may not have sufficient capacity to receive the boot images or may be a memory from which execution of the boot images is not optimal. Thus, some of the boot images may not be streamed or transferred until after the memory controller is fully initialized to enable transfers to other preferred memories. Initializing the memory controller, however, expends computing resources and consumes time, which can slow device boot times.

This disclosure describes apparatuses and techniques for dynamic boot image streaming, which enable boot images to be streamed to non-contiguous memory locations and/or to multiple memories. By so doing, the boot images can be streamed to various memory locations without fully initializing the memory controller, thereby conserving computing resources, saving time, and/or reducing device boot times.

The following discussion describes an operating environment, techniques that may be employed in the operating environment, and a System-on-Chip (SoC) in which components of the operating environment can be embodied. In the discussion below, reference is made to the operating environment by way of example only.

Operating Environment

Figure 1:
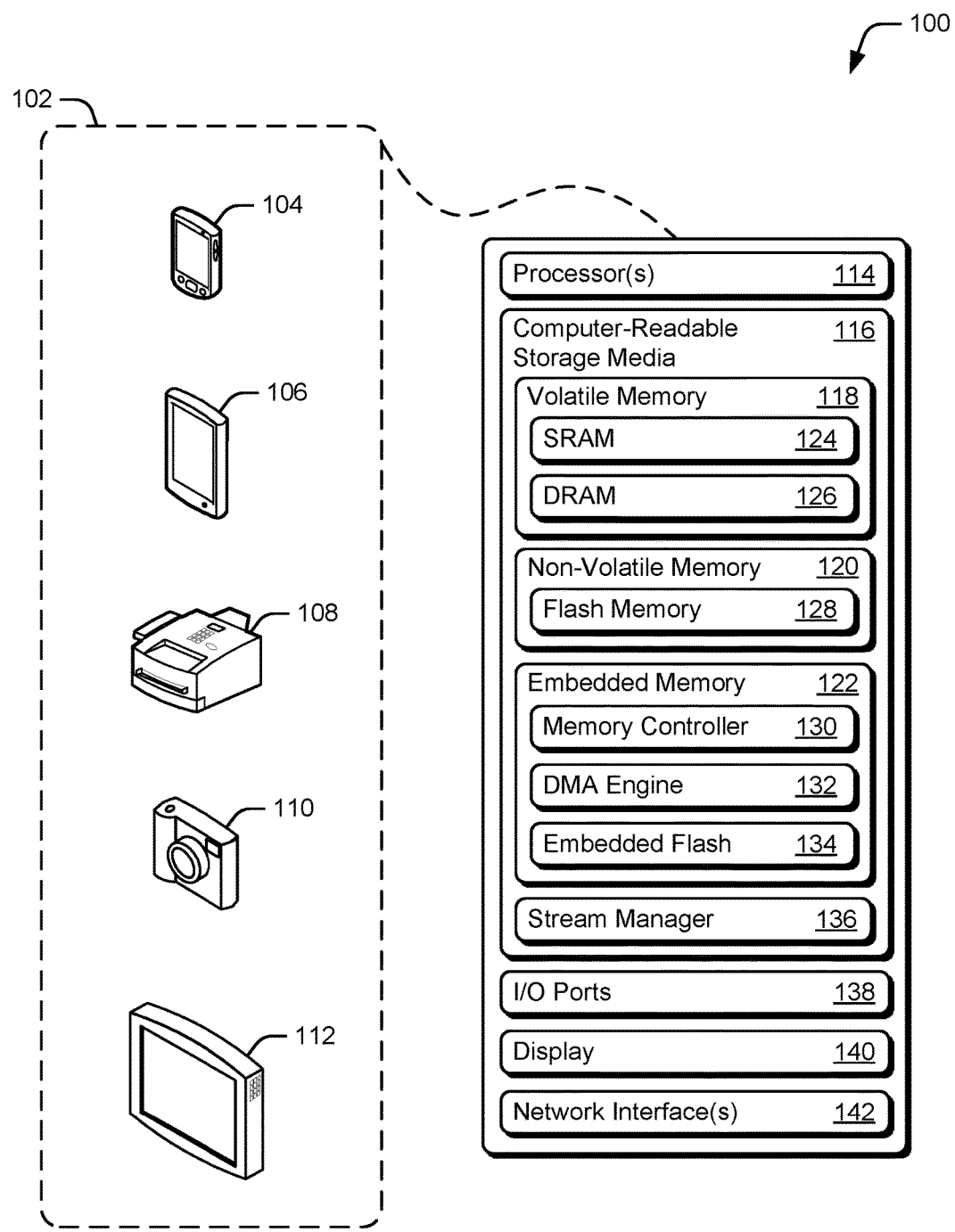
FIG. 1 illustrates an operating environment having computing devices in accordance with one or more aspects.

FIG. 1 illustrates an example of an operating environment 100 having computing devices 102, each of which are capable of communicating, accessing, presenting, or processing various data. Computing devices 102 include smart-phone 104, tablet computer 106, multi-function printer 108, and digital camera 110, and internet-protocol enabled television 112 (IP TV 112). Although not shown, other configurations of computing devices 102 are also contemplated such as a desktop computer, server, mobile-internet device (MID), gaming console, mobile hotspot, networked media player, and so on.

Generally, computing devices 102 have operational states ranging from an "off" state to an "on" state. These states may include a fully off state, suspended state, sleep state, hibernation state, idle state, active state, and the like. When transitioning from a lower operational state to a higher operational state (e.g., from an off state to an active state), computing device 102 is booted. Booting computing device 102 includes transferring and/or executing low-level code to configure components of computing device 102 for operation.

Each computing device 102 includes processor(s) 114 (e.g. an application processor) and computer-readable storage media 116 (CRM 116). Processor 114 includes any suitable number and/or type of processing cores, which may be configured in any suitable manner (e.g., a heterogeneous multi-core application processor). CRM 116 includes volatile memory 118, non-volatile memory 120, and embedded memory 122. Volatile memory 118 includes static random access memory 124 (SRAM 124) and synchronous dynamic random-access memory 126 (DRAM 126). Alternately or additionally, volatile memory 118 may include other suitable types of memory, such as random-access memory (RAM), asynchronous dynamic RAM, double-data-rate RAM (DDR), and the like.

Non-volatile memory 120 includes flash memory 128, which may store data of computing device 102 persistently when powered-down or suspended. Alternately or additionally, non-volatile memory 120 may include other suitable types of memory or storage devices such as non-volatile RAM (NVRAM), read-only memory (ROM), solid-state drives, magnetic or optical disk drives, and the like. Operating systems, applications, or user data (not shown) of computing device 102 may be stored by, or executed from, volatile memory 118, non-volatile memory 120, or any other suitable type of CRM 116. Alternately or additionally, operating systems and/or applications of computing device 102 may be embodied as firmware or other processor-executable instructions, binaries, or code. Operating systems and applications of device 102 are executable by processor 114 to provide a user interface, various functionalities, and/or services of computing device 102.

Embedded memory 122 includes memory controller 130, direct memory access engine 132 (DMA engine 132), and embedded flash memory 134 (embedded flash 134). Embedded memory 122, and components thereof, may be implemented as an integrated memory device, such as an embedded multimedia card (eMMC) device. Memory controller 130 enables access of embedded memory 122 and may provide various data management functions for embedded flash 134, such as error-correction coding, block management, or wear leveling. Memory controller 130 may be implemented as any suitable type of controller, such as a secure digital (SD) host controller. Memory controller 130 supports a variety of data transfer operations, such as an advanced direct memory access (ADMA) transfer algorithm.

The ADMA transfer algorithm is a scatter gather algorithm and operates via a set of transfer and link descriptors. The descriptors may be organized by a descriptor table (not shown), which may be programmed with descriptors describing a series of data transfers between embedded memory 122 and other memories of computing device 102. The descriptors may be executed from the descriptor table without interrupting software executing on processor 114 (e.g., a memory host driver). Memory controller 130 may also support various boot modes, such as an alternate boot mode capable of implementing ADMA transfers. Accordingly, memory controller 130 may be configured to transfer data of embedded flash 134 when computing device 102 is booted.

DMA engine 132 enables direct memory access (DMA) operations between embedded memory 122 and other memories of computing device 102 (e.g., SRAM 124 or DRAM 126). DMA operations transfer data from a source memory to a destination memory without involving a higher-level controller or processor. These DMA operations may include single operation DMA algorithms as defined by the secure digital (SD) host controller standard version 1.00. Additionally, the DMA operations may include scatter gather DMA algorithms (e.g., ADMA) as defined by the SD host controller standard version 2.00. For example, DMA engine 132 may transfer data from embedded flash 134 to SRAM 124 via an ADMA transfer without involving or interrupting memory controller 130 or processor 114. Embedded flash 134 is accessible via memory controller 130 or DMA engine 132, and may contain low-level code (e.g., boot code or boot loaders) useful for booting computing device 102.

Embedded flash 134 may be single-level cell (SLC) or multi-level cell (MLC) based managed flash memory. In some cases, embedded flash may include an area of SLC flash memory and an area of MLC flash memory. Embedded flash 134 may contain boot code or other initialization information useful for booting computing device 102. Contents and partitioning of embedded flash 134 may vary and are described below.

CRM 116 also contains data stream manager 136 (stream manager 136), which in this particular example, is embodied as processor-executable instructions that are executable by processor 114 to implement various functionalities. Alternately or additionally, stream manager 136 may be implemented, in part or whole, via firmware or hardware (not shown) or any suitable combination thereof. Stream manager 136 may enable boot images or boot data stored by embedded flash 134 to be streamed to non-contiguous memory locations and/or to multiple destination memory devices. The implementation and use of stream manager 136 varies and is described below.

Computing device 102 may also include I/O ports 138, display 140, and network interface(s) 142. I/O ports 138 allow computing device 102 to interact with other devices or users. I/O ports 138 may include any combination of internal or external ports, such as USB ports, audio ports, Serial ATA (SATA) ports, PCI-express based ports or card-slots, secure digital input/output (SDIO) slots, and/or other legacy ports. Various peripherals may be operatively coupled with I/O ports 138, such as human-input devices (HIDs), external computer-readable storage media, or other peripherals.

Display 140 may present a user interface or rendered graphics associated with an operating system or application of computing device 102. Display 140 may include a touch-input sensor (not shown), such as a touch screen or touch-sensitive overlay. Network interface(s) 142 provides connectivity to one or more networks and other devices connected therewith. Data communicated over network interfaces 142 may be packetized or framed depending on a communication protocol or standard by which computing device 102 is communicating. Network interfaces 142 may include wired interfaces, such as Ethernet or fiber optic interfaces for communication over a local network, intranet, or the Internet. Network interfaces 142 may also include wireless interfaces that facilitate communication over wireless networks, such as wireless LANs, cellular networks, or wireless personal-area-networks (WPANs).

Figure 2:
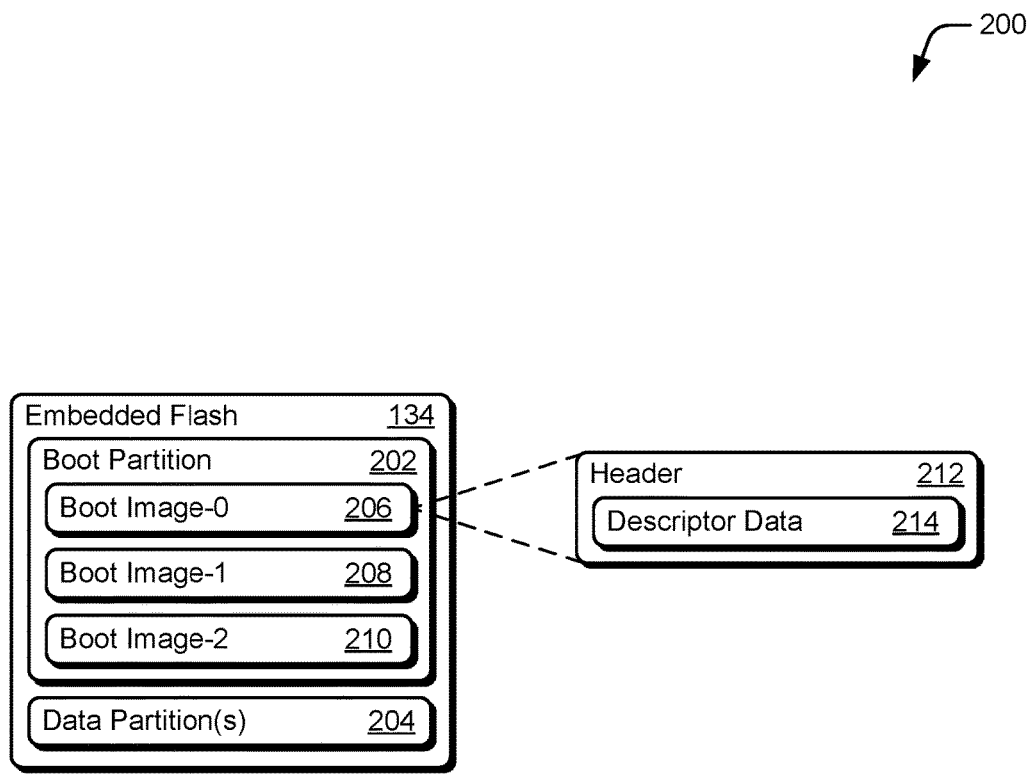
FIG. 2 illustrates an example of embedded flash memory of FIG. 1 in accordance with one or more aspects.

FIG. 2 illustrates an example of embedded flash 134 generally at 200. Embedded flash 134 includes boot partition 202 and data partition 204, capacities of which may be configured to any suitable size or number of data blocks. Data partition 204 may include data associated with an operating system, applications, hardware drivers, user data, and the like. Boot partition includes boot code (e.g., low-level code) and other data useful for configuring components of, and subsequently booting, computing device 102. In this particular example, boot partition 202 includes boot image-0 206, boot image-1 208, and boot image-2 210 (referred to collectively as boot images 206-210). Boot partition 202 may also include boot code or data useful for constructing descriptors for streaming boot images 206-210 from boot partition 202. Boot images 206-210 may include any suitable code, such as boot code, boot loaders, initialization data, headers, address tables, descriptors, firmware, configuration instructions, and the like.

Boot image-0 206 includes header 212 and is streamed from boot partition 202 using a transfer descriptor. Header 212 includes descriptor data 214, which is useful to construct transfer descriptors for streaming boot image-1 208 and/or boot image-2 210 from boot partition 202. Header 212 may also include data useful for configuring other memories of computing device 102, such as DRAM 126. Header 212 may include any suitable amount of data, such as 16 or 32 blocks of data.

Transfer descriptors typically include a destination address, a length indicator specifying an amount of data to transfer, and various attribute fields (e.g., descriptor type, validity, end, interrupt action). In this particular example, a transfer descriptor for transferring boot image-0 206 includes information or parameters for streaming header 212 from embedded flash 134. This descriptor and a link-to-self descriptor may be constructed in volatile memory (e.g., SRAM 124) prior to being input into DMA engine 132 for execution. The link-to-self descriptor is a link type descriptor that references, or points back to, itself. Causing a memory controller to execute the link-to-self descriptor may be effective to stall the memory controller. Alternately or additionally, executing a link-to-self descriptor may stall data lines or a clock line of a memory controller. The use of the link-to-self descriptor may vary and is described below.

Techniques of Dynamic Boot Image Streaming

The following discussion describes techniques of dynamic boot image streaming. These techniques can be implemented using the previously described environment or entities, such as memory controller 130 or stream manager 136 of FIG. 1 embodied on a computing device 102. These techniques include methods illustrated in FIGS. 3, 5, and 6, each of which is shown as a set of operations performed by one or more entities. These methods are not necessarily limited to the orders shown for performing the operations. Further, these methods may be used in conjunction with one another, in whole or in part, whether performed by the same entity, separate entities, or any combination thereof. In portions of the following discussion, reference will be made to operating environment 100 of FIG. 1 and entities of FIGS. 2 and 4 by way of example. Such reference is not to be taken as limited to operating environment 100 but rather as illustrative of one of a variety of examples.

Figure 3:
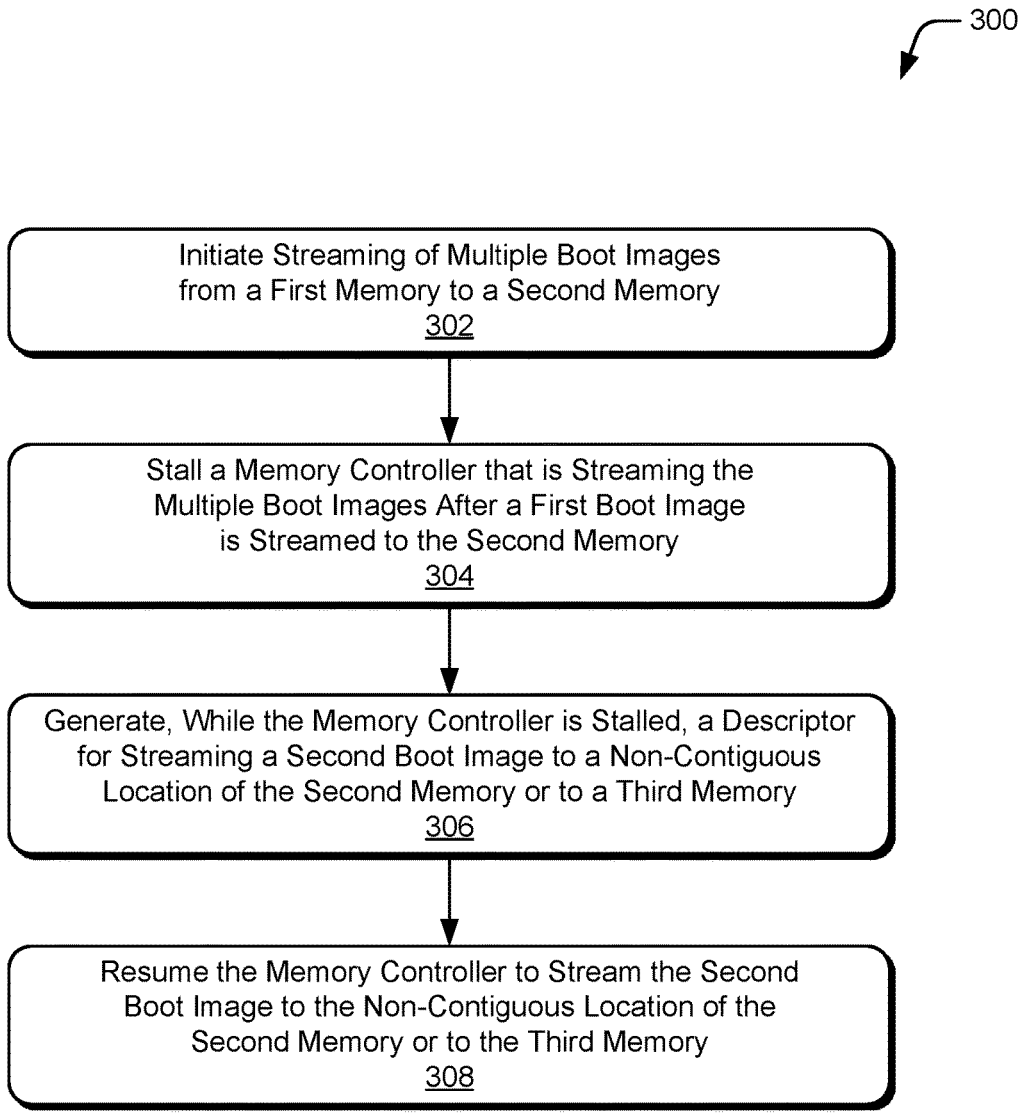
FIG. 3 illustrates a method for stalling a memory controller that is streaming multiple boot images.

FIG. 3 depicts a method 300 for stalling a memory controller streaming multiple boot images, including operations performed by stream manager 136 of FIG. 1.

At 302, a streaming of multiple boot images from a first memory to a second memory is initiated. The streaming may be initiated responsive to a power-on event or a command (e.g., a boot initiation command). The multiple boot images are streamed by a memory controller or DMA engine associated with the first memory. The streaming operations performed by the memory controller or DMA engine are based on one or more ADMA transfer and/or link descriptors. A first one of the boot images may include transfer descriptors and/or a header of fixed length, such as 16 or 32 data blocks. This header includes information useful to construct additional descriptors or to configure other memories. Other ones of the multiple boot images may include boot loaders, configuration files, operating systems, boot code, and the like.

Figure 4:
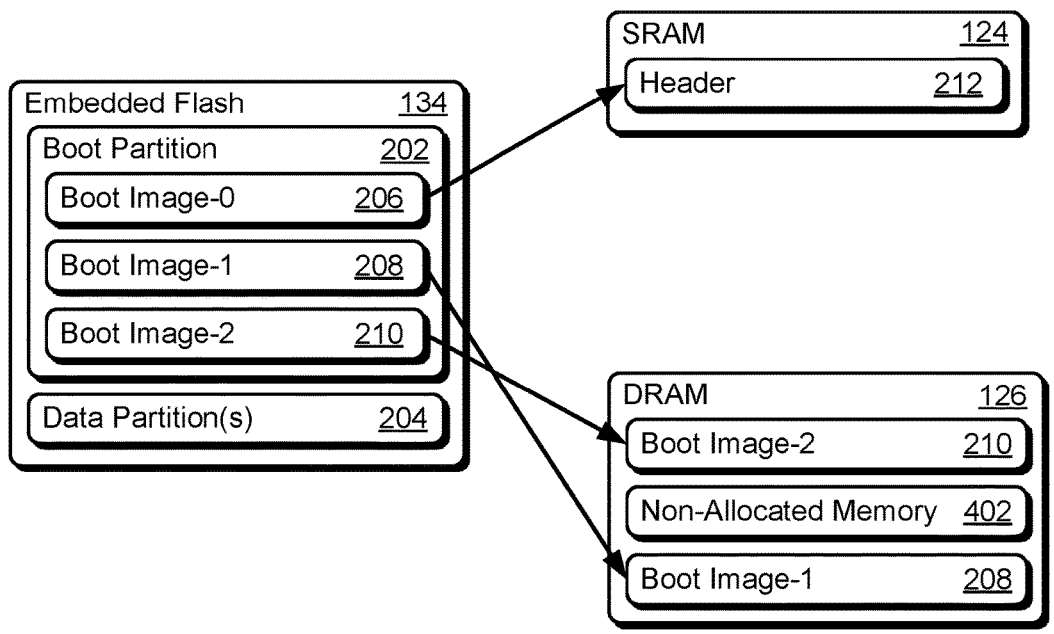
FIG. 4 illustrates an example allocation of boot images in accordance with one or more aspects.

As an example, consider a user powering-on smart-phone 104 of FIG. 1. Assume here that smart-phone 104 is transitioning to an "on" state from an "off" state in which power was removed from volatile memory 118 and other various components of smart-phone 104. Here, stream manager 136 sends a boot initiation command (e.g., CMD_0 0xFFFFFFFA) to memory controller 130 of embedded memory 122, which may be configured as an eMMC device. Stream manager 136 then points EXT_CSD register of memory controller 130 to a transfer descriptor when initiating a streaming operation. In some cases, stream manager 136 may construct the transfer descriptor and/or a link-to-self descriptor prior to initiating the streaming operation. The transfer descriptor indicates a destination address of SRAM 124 to which boot image-0 206 (header 212) is to be streamed. DMA engine 132, which is associated with memory controller 130, then begins to stream boot image-0 206 to SRAM 124 as illustrated in FIG. 4.

At 304, a memory controller that is streaming the multiple boot images is stalled. The memory controller may be stalled after a first one of the boot images is streamed into the second memory. The first one of the boot images may be a header file including data useful to construct transfer descriptors for other ones of the multiple boot images. The memory controller may be stalled by causing the memory controller to execute a link-to-self descriptor. In some cases, the memory controller is configured to incrementally execute a series of descriptors during the streaming operation. In such case, the link-to-self descriptor may be placed in a memory location following a location of the descriptor for streaming the first boot image.

In the context of the present example, assume that a link-to-self descriptor is located at an address following the transfer descriptor. Once memory controller 130 of embedded memory 122 executes the transfer descriptor to stream boot image-0 206 via DMA engine 132, a system address register of memory controller 130 is incremented to the address of the link-to-self descriptor. Memory controller 130 then begins executing the link-to-self descriptor, and operation of memory controller 130 stalls. Executing the link-to-self descriptor also stalls a clock line of embedded memory 122 and DMA engine 132.

At 306, a descriptor for streaming a second one of the multiple boot images is generated while the memory controller is stalled. This descriptor is generated by a processor executing code of the first boot image (e.g., descriptor data 214 of header 212) from the second memory. The descriptor is a transfer descriptor for streaming the second boot image to a non-contiguous location of the second memory or a third memory. In some cases, the descriptor is constructed from a header previously streamed to the second memory. Alternately or additionally, the header may include initialization data for the third memory, such as data for configuring for DRAM or DDR. Memory controller 130 and DMA engine 132 are not necessarily aware of being stalled while the descriptor is generated.

Continuing the ongoing example, stream manager 136 causes processor 114 to execute boot code of header 212 from SRAM 124 to construct additional descriptors. These additional descriptors are associated with boot image-1 208 and boot image-2 210. Processor 114 also executes the boot code of header 212 to configure DRAM 126 for receiving boot image-1 208 and boot image-2 210. In other instances, the additional descriptors are configured to stream boot images to non-contiguous locations of SRAM 124, such as specifying offsets between destination addresses for the boot images.

At 308, the memory controller is resumed to stream the second boot image to the non-contiguous location of the second memory or to the third memory. The memory controller is resumed by pointing the link-to-self descriptor to a descriptor for streaming the second boot image. Resuming the memory controller causes the DMA engine to continue the streaming operation initiated at 302 without interrupting a host controller driver. Resuming the memory controller also resumes data lines or the clock line associated with the memory controller. By so doing, boot images can be streamed to non-contiguous and/or non-sequential locations of multiple memories with a single streaming operation (e.g. ADMA transfers in alternate boot mode).

Concluding the present example, stream manager 136 points the link-to-self descriptor being executing by memory controller 130 to a first of the additional descriptors generated while memory controller 130 was stalled. This is effective to cause memory controller 130 to resume the streaming operation boot image-1 208 and boot image-2 210 based on the additional link descriptors. Here, DMA engine 132 streams boot image-1 208 and boot image-2 210 to non-contiguous and non-sequential locations of DRAM 126 as illustrated by FIG. 4. Processor 114 can then complete the boot process of smart-phone 104 by executing the boot code from the respective locations of SRAM 124 and DRAM 126.

Figure 5:
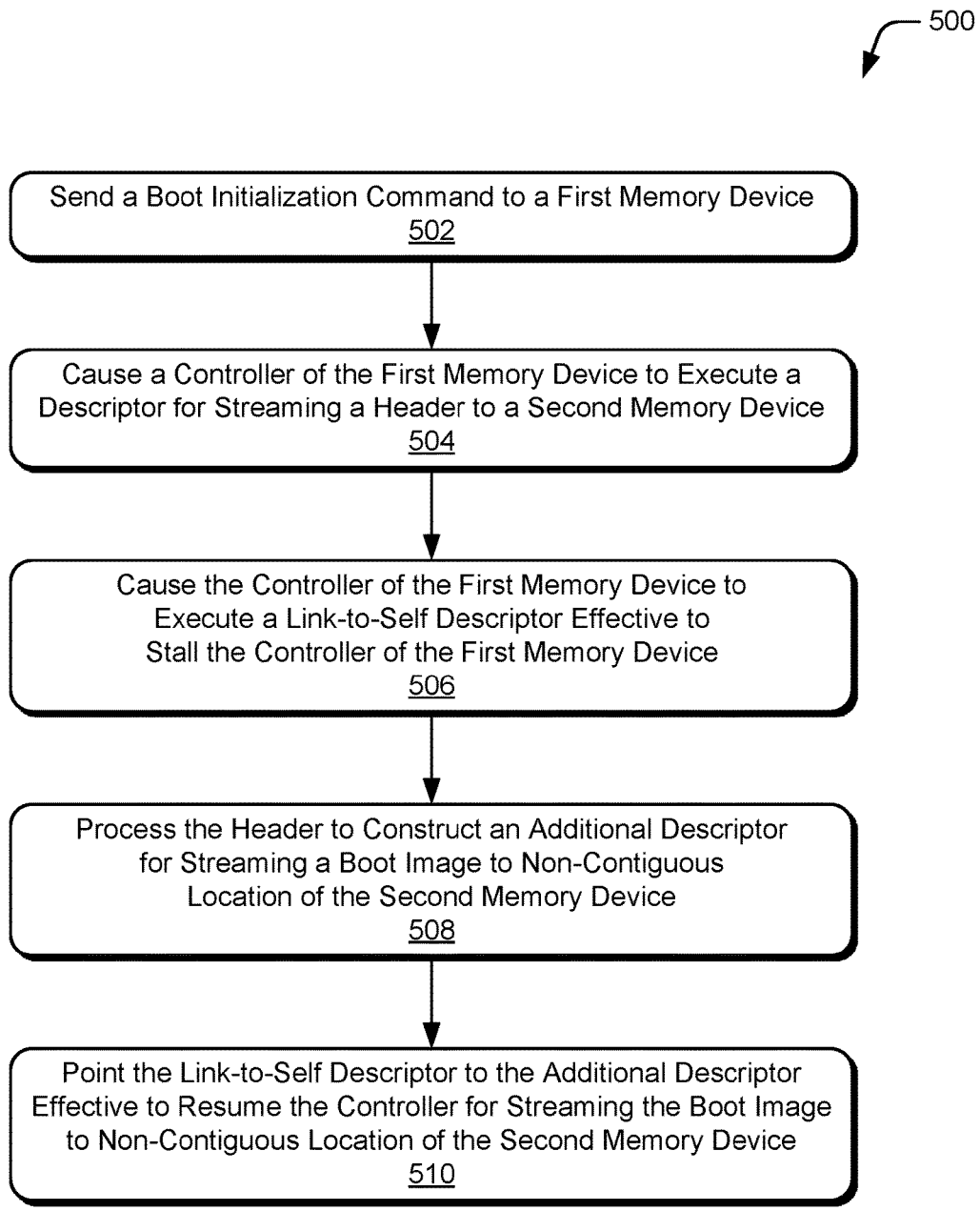
FIG. 5 illustrates a method for streaming boot images to non-contiguous locations of a memory device.

FIG. 5 depicts a method 500 for streaming boot images to non-contiguous locations of a memory device, including operations performed by stream manager 136 of FIG. 1.

At 502, a boot initialization command is sent to a first memory device. In some cases, the memory device may be an embedded memory device configured to transfer boot code, such as an eMMC memory device. The boot initialization command is sent to a controller of the first memory device. Alternately or additionally, a pre-idle command may be sent to the memory controller to put the memory device into an initial power-on-reset mode. The pre-idle command may be sent prior to sending the boot initialization command to the memory device. The memory device is pre-configured to stream a boot image responsive to the boot initialization command. For example, a boot partition and associated size of the boot partition are set in a register accessible by the memory controller (e.g., an EXT_CSD register). In some cases, the boot initialization command is sufficient to cause the memory device to start memory transfers associated with booting a device.

At 504, a controller of the first memory device is caused to execute a descriptor for streaming a header to a second memory device. An address of the descriptor may be indicated by a register of the controller. The descriptor indicates a length of the header, such as 16 or 32 data blocks. In some cases, the header is streamed by a DMA engine associated with the controller. The second memory device may be a memory device that needs little or no pre-configuration prior to receiving the header, such as SRAM and the like.

At 506, the controller of the first memory device is caused to execute a link-to-self descriptor effective to stall the controller of the memory device. In some cases, stalling the controller stalls data lines or a clock line associated with the controller. Alternately or additionally, a DMA engine associated with the controller may also be stalled while the controller executes the link-to-self descriptor. For example, stream manager 136 may cause memory controller 130 to execute a link-to-self descriptor after a header is streamed into SRAM.

At 508, the header is processed to construct additional descriptors for streaming one or more boot images to non-contiguous locations of the second memory device. The header is executed from the second memory device by a processor to construct the additional descriptors. The additional descriptors may be constructed while the memory controller is stalled. In some cases, the one or more boot images include boot loader or boot code for configuring components of a device for use. The second memory can be a volatile memory from which the one or more boot images are executed from.

At 510, the link-to-self descriptor is pointed to the additional descriptors effective to resume the controller of the first memory device. The first memory device then streams the one or more boot images to non-contiguous locations of the second memory device. For example, stream manager 136 may point a link-to-self descriptor being executed by memory controller 130 to data descriptors for streaming boot images 206-210 or remaining code thereof.

Figure 6:
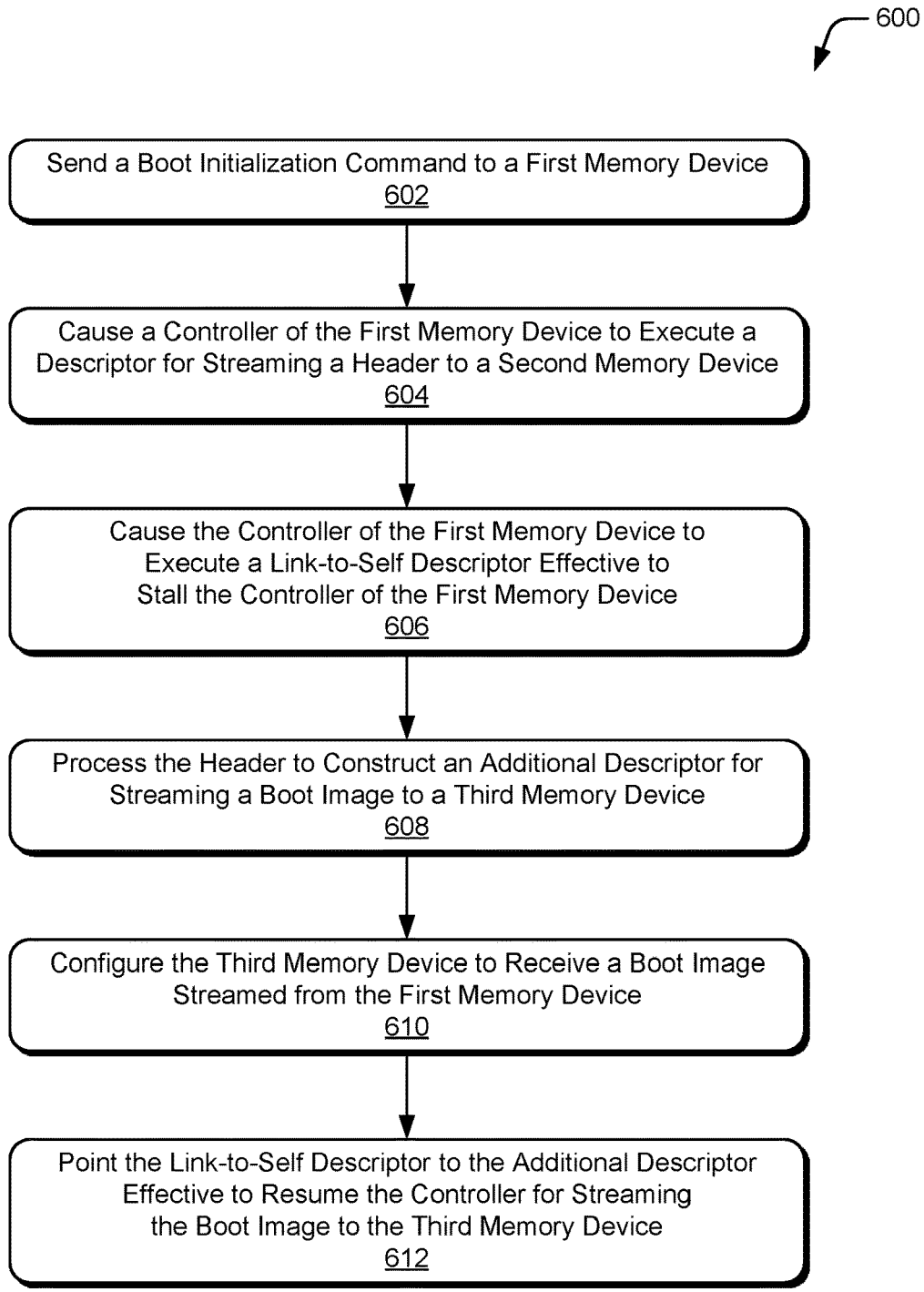
FIG. 6 illustrates a method for streaming boot images to multiple memory devices.

FIG. 6 depicts a method 600 for streaming boot images to multiple memory devices, including operations performed by stream manager 136 of FIG. 1.

At 602, a boot initialization command is sent to a first memory device. In some cases, the first memory device is an embedded memory device configured to transfer boot code during a boot sequence, such as an eMMC memory device. A pre-idle command (e.g., CMD 0xF0F0F0F0) can be sent prior to the boot initialization command to put the first memory device in a pre-idle state. The boot initialization command is sent to a controller of the first memory device. In some cases, the first memory device is pre-configured to stream a boot image responsive to the boot initialization command. For example, a boot partition and associated size of the boot partition may be set in a register accessible by the memory controller (e.g., an EXT_CSD register). In such cases, the boot initialization command is sufficient to cause a controller to start streaming boot images from the first memory device.

At 604, a controller of the first memory device is caused to execute a descriptor for streaming a header to a second memory device. An address of the descriptor is indicated by a register of the controller. The descriptor may also indicate a length of the header, such as 16 or 32 data blocks. In some cases, the header is streamed by a DMA engine associated with the controller. The second memory device may be a memory device that needs little or no pre-configuration prior to receiving the header, such as SRAM and the like.

At 606, the controller of the first memory device is caused to execute a link-to-self descriptor effective to stall the controller of the memory device. Stalling the controller may stall data lines or a clock line associated with the controller. Alternately or additionally, a DMA engine associated with the controller may also be stalled while the controller executes the link-to-self descriptor. For example, stream manager 136 can cause memory controller 130 to execute a link-to-self descriptor after a header is streamed into SRAM.

At 608, the header is processed to construct additional descriptors for streaming multiple boot images to a third memory device. The header may be executed from the second memory device by a processor to construct the additional descriptors. The additional descriptors are constructed while the memory controller is stalled. In some cases, the multiple boot images include boot loader or boot code for configuring components of a device for use. The third memory device is a volatile memory that is of a different type than that of the second memory device. For example, the second memory device may comprise SRAM and the third memory device may comprise DRAM.

At 610, the third memory device is configured to receive a boot image streamed from the first memory device. In some cases, third memory is configured based on data or information included in the header. In such cases, the processor executes additional data of the header to configure the third memory device. Configuring the third memory device may include setting various parameters associated with the third memory device, such as bus settings, data rate settings, bank address settings, and the like.

At 612, the link-to-self descriptor is pointed to the additional descriptors effective to resume the controller of the first memory device. The first memory device then streams the multiple boot images to the third memory device. For example, stream manager 136 may point a link-to-self descriptor being executed by memory controller 130 to data descriptors for streaming boot images 206-210. The multiple boot images are streamed to non-contiguous and/or non-sequential locations of the third memory device. For example, boot image-2 210 can be streamed to a base address of DRAM 126 and boot image-1 208 may be streamed to another non-contiguous location of DRAM 126 as illustrated in FIG. 4.

System-on-Chip

Figure 7:
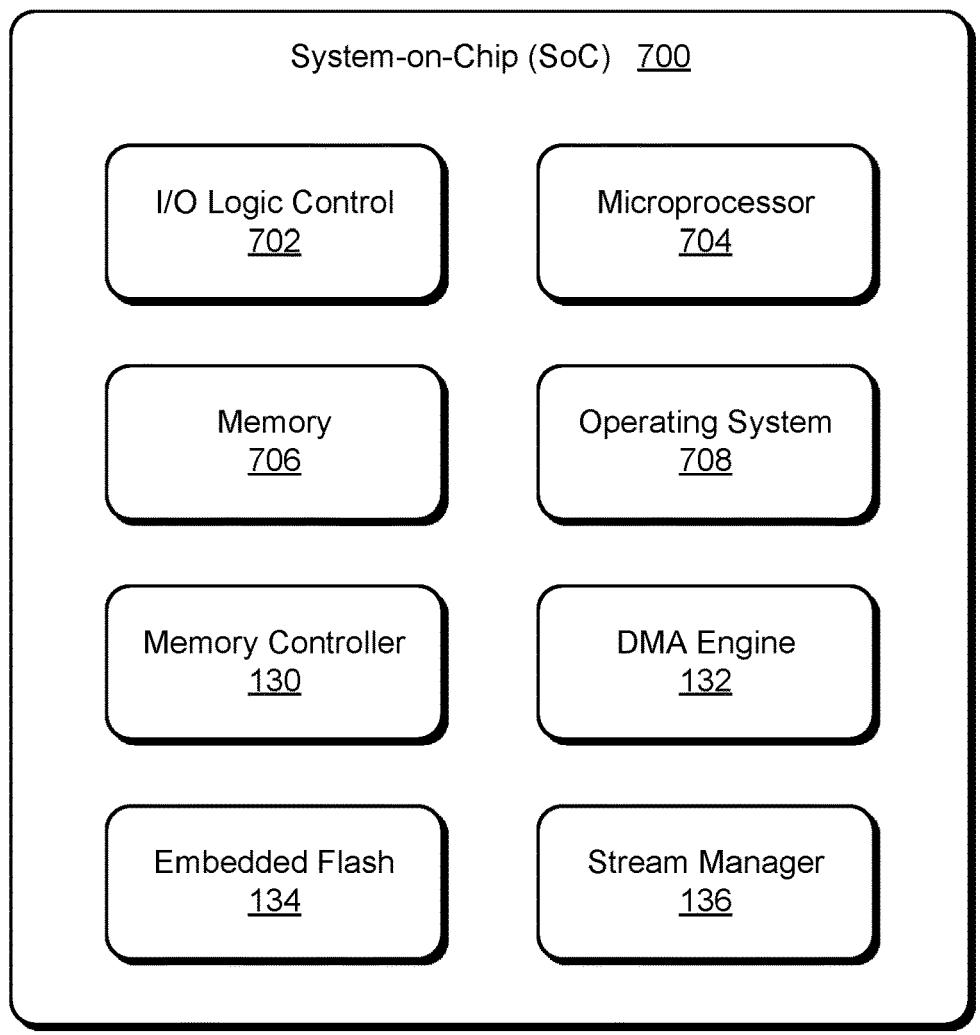
FIG. 7 illustrates a System-on-Chip (SoC) environment for implementing aspects of the techniques described herein.

FIG. 7 illustrates a System-on-Chip (SoC) 700, which can implement various aspects of dynamic boot image streaming. A SoC can be implemented in any suitable device, such as a video game console, IP-enabled television, smartphone, desktop computer, laptop computer, access point, wireless router, cellular broadband router, tablet computer, server, network-enabled printer, set-top box, printer, scanner, camera, picture frame, home appliance, thermostat, home automation device, and/or any other type of electronic device.

SoC 700 can be integrated with electronic circuitry, a microprocessor, memory, input-output (I/O) logic control, communication interfaces, other hardware, firmware, and/or software needed to provide functionalities of a device, such as any of the above-listed devices. SoC 700 can also include an integrated data bus (not shown) that couples the various components of the SoC for data communication between the components. A memory storage device that includes SoC 700 can also be implemented with many combinations of differing components. In some cases, these differing components may be configured to implement concepts described herein over various internal or external data interfaces.

In this example, SoC 700 includes various components such as an input-output (I/O) logic control 702 (e.g., to include electronic circuitry) and microprocessor 704. SoC 700 also includes memory 706, which can be any type and/or combination of RAM, SRAM, DRAM, low-latency nonvolatile memory, ROM, one-time programmable (OTP) memory, and/or other suitable electronic data storage. Alternately or additionally, SoC 700 may comprise a data interface (not shown) for accessing additional or expandable off-chip memory, such as external SRAM, DRAM, or flash memory. SoC 700 can also include various firmware and/or software, such as operating system(s) 708, which can be computer-executable instructions maintained by memory 706 and executed by microprocessor 704. SoC 700 may also include other various communication interfaces and components embodied as hardware, firmware, software, or any suitable combination thereof.

SoC 700 also includes memory controller 130, DMA engine 132 embedded flash 134, and stream manager 136 (either of which may embodied as disparate or combined components). Although not shown, embedded flash 134 may include boot partition 202 and data partition 204, for storing any suitable data (e.g., user data or boot images 206-210). Examples of these various components, functions, and/or entities, and their corresponding functionality, are described with reference to the respective components of the environment 100 and various configurations as illustrated by FIGS. 2 and 4.

Stream manager 136, either independently or in combination with other entities (e.g., memory controller 130), can be implemented as computer-executable instructions maintained by memory 706 and executed by microprocessor 704 to implement various embodiments and/or features described herein. Stream manager 136 may also be provided integral with other entities of the SoC, such as integrated a memory controller associated with memory 706 or another suitable software, firmware, or hardware component within SoC 700. Alternatively or additionally, stream manager 136 and the other components can be implemented as hardware, firmware, fixed logic circuitry, or any combination thereof that is implemented in connection with the I/O logic control 702 and/or other signal processing and control circuits of SoC 700.

Although the subject matter has been described in language specific to structural features and/or methodological operations, it is to be understood that the subject matter defined in the appended claims is not necessarily limited to the specific features or operations described above, including orders in which they are performed.

What is claimed is:

1. A method comprising:

executing, from a first memory of a host device, a data transfer command to stream, via a direct memory access (DMA) controller, a header stored in the first memory to a base address of a second memory of the host device;

executing a data link command to stall the DMA controller for at least a portion of time during which a processor of the host device constructs, based on the header streamed to the second memory, additional data transfer commands in the second memory for streaming, via the DMA controller, multiple boot images stored in the first memory to non-contiguous locations of the second memory or to a third memory of the host device; and in response to the data link command being pointed to a first data transfer command of the additional data transfer commands, causing the DMA controller to resume effective to stream, via the DMA controller and based at least in part on the first data transfer command, the multiple boot images from the first memory to the non-contiguous locations of the second memory or to the third memory of the host device.

2. The method of claim 1, further comprising receiving a boot initialization command from the host device and wherein the first data transfer command is executed in response to receiving the boot initialization command.

3. The method of claim 1, further comprising configuring, based on the header streamed to the second memory, the third memory to receive one or more of the multiple boot images streamed from the second memory.

4. The method of claim 1, wherein the data link command is a link-to-self descriptor that is streamed to the second memory prior to execution.

5. The method of claim 1, wherein the method is implemented at least in part by a memory controller associated with the first memory and execution of the data link command is effective to stall a clock line of the memory controller.

6. The method of claim 5, wherein the first memory, DMA controller, and memory controller are embodied as part of an embedded multimedia card (eMMC) device.

7. The method of claim 1, wherein:

the first memory comprises single-level cell (SLC) or multi-level cell (MLC) NAND based managed flash memory;

the second memory comprises static random-access memory (SRAM); or the third memory comprises dynamic random-access memory (DRAM).

8. The method of claim 1, wherein the multiple boot images are executable by the processor of the host device to initialize other components of the host device during a boot sequence.

9. A memory device comprising:

a memory controller configured to provide an interface to a data bus of a host device;

a direct memory access (DMA) controller configured to stream data of the memory device to other memory devices of the host device via the data bus; and memory storage media configured to store the data of the memory device, the data of the memory device comprising:

multiple boot images executable by a processor of the host device to initialize components of the host device;

a header executable by the processor of the host device to construct a series of data transfer commands for streaming the multiple boot images, via the DMA controller, to non-contiguous locations of the other memory devices;

another data transfer command associated with the header that, when executed by the memory controller, streams the header, via the DMA controller, to one of the other memory devices of the host device; and a data link command that:

(i) when executed by the memory controller, stalls the DMA controller effective to permit the header to be executed from the other memory device by the processor to construct the series of data transfer commands for streaming, via the DMA controller, the multiple boot images, and (ii) when pointed to a first data transfer command of the series of data transfer commands, causes the DMA controller to resume operation effective to stream, via the DMA controller and based at least in part on the first data transfer command, the multiple boot images to the non-contiguous locations of the other memory devices.

10. The memory device of claim 9, wherein the series of data transfer commands and the other data transfer command are advanced direct memory access (ADMA) transfer descriptors and the data link command is an ADMA link descriptor.

11. The memory device of claim 10, wherein the ADMA link descriptor is a link-to-self descriptor that, when executed by the memory controller, stalls the memory controller until the link-to-self descriptor is pointed to an address of one of the ADMA transfer descriptors.

12. The memory device of claim 9, wherein stalling the memory controller stalls a clock line or data lines of the memory controller.

13. The memory device of claim 9, wherein:

the memory storage media comprises single-level cell (SLC) or multi-level cell (MLC) NAND based flash memory; and the other memory devices comprise static random-access memory (SRAM) or dynamic random-access memory (DRAM).

14. The memory device of claim 13, wherein the other data transfer command is configured to stream the header to the SRAM of the host device and the series of data transfer commands are configured to stream the multiple boot images to non-contiguous locations of the SRAM or DRAM of the host device.

15. The memory device of claim 13, wherein the other data transfer command is configured to stream the header to the DRAM of the host device and the series of data transfer commands are configured to stream the multiple boot images to non-contiguous locations of the DRAM or SRAM of the host device.

16. The memory device of claim 9, wherein the memory device is embodied as an embedded multimedia card (eMMC) device, the memory controller comprises a secure digital (SD) host controller, and the memory storage media comprises flash memory.

17. The memory device of claim 16, wherein the eMMC device is compliant with version 4.3 of the Joint Electron Device Engineering Council (JEDEC) multimedia card (MMC) standard.

18. An apparatus comprising:
a processor configured to execute processor-executable instructions;
a memory from which processor-executable instructions are executable by the processor; and
an embedded memory device comprising:
  a memory controller having an interface to a data bus of the apparatus;
  a direct memory access (DMA) controller configured to stream data of the embedded memory device to the memory of the apparatus via the data bus; and
  memory storage media storing the data of the embedded memory device, the data of the embedded memory device comprising:
    multiple boot images executable by the processor to initialize components of the apparatus;
    a header executable by the processor to construct a series of data transfer commands for streaming the multiple boot images, via the DMA controller, to non-contiguous locations of the memory of the apparatus;
    another data transfer command associated with the header that, when executed by the memory controller, streams the header, via the DMA controller, to the memory of the apparatus; and
    a data link command that;
      (i) when executed by the memory controller, stalls the DMA controller effective to permit the header to be executed from the memory of the apparatus by the processor to construct the series of data transfer commands for streaming, via the DMA controller, the multiple boot images; and
      (ii) when pointed to a first data transfer command of the series of data transfer commands, causes the DMA controller to resume operation effective to stream, based at least in part on the first data transfer command, the multiple boot images to the non-contiguous locations of the memory of the apparatus.

19. The apparatus of claim 18, wherein the embedded memory device is embodied as an embedded multimedia card (eMMC) device.

20. The apparatus of claim 18, wherein:
the memory storage media comprises single-level cell (SLC) or multi-level cell (MLC) NAND based flash memory; and
the memory of the apparatus comprises static random-access memory (SRAM) or dynamic random-access memory (DRAM).

* * * * *